United States Patent
Cooper

(10) Patent No.: US 8,682,325 B1
(45) Date of Patent: *Mar. 25, 2014

(54) HANDOVER BETWEEN MOBILE COMMUNICATION NETWORKS

(75) Inventor: David Cooper, Surrey (GB)

(73) Assignee: NEC Corporation, Tokyo (JP)

( * ) Notice: Subject to any disclaimer, the term of this patent is extended or adjusted under 35 U.S.C. 154(b) by 1369 days.

This patent is subject to a terminal disclaimer.

(21) Appl. No.: 09/589,217

(22) Filed: Jun. 7, 2000

(30) Foreign Application Priority Data

Jun. 7, 1999 (GB) .................................. 9913218.5

(51) Int. Cl.
*H04Q 7/20* (2006.01)

(52) U.S. Cl.
USPC ............ 455/436; 455/437; 455/439; 455/443; 455/435.2; 370/331; 370/328; 370/344; 370/347; 370/333

(58) Field of Classification Search
USPC .............. 455/436, 437, 438, 439, 442, 435.2, 455/432.1, 452.1, 450, 433, 444; 370/331, 370/328, 347, 344, 332, 333; 375/260
See application file for complete search history.

(56) References Cited

U.S. PATENT DOCUMENTS

| | | | | |
|---|---|---|---|---|
| 4,670,905 A | * | 6/1987 | Sandvos et al. | 455/524 |
| 5,159,625 A | * | 10/1992 | Zicker | 455/432.1 |
| 5,309,503 A | * | 5/1994 | Bruckert et al. | 455/452.2 |
| 5,442,806 A | * | 8/1995 | Barber et al. | 455/435.2 |
| 5,452,471 A | * | 9/1995 | Leopold et al. | 455/429 |
| 5,594,781 A | * | 1/1997 | Kozdon et al. | 455/442 |
| 5,657,375 A | * | 8/1997 | Connolly et al. | 455/436 |
| 5,664,005 A | * | 9/1997 | Emery et al. | 455/422.1 |
| 5,682,419 A | * | 10/1997 | Grube et al. | 455/450 |
| 5,734,980 A | * | 3/1998 | Hooper et al. | 455/434 |
| 5,745,481 A | * | 4/1998 | Phillips et al. | 370/313 |
| 5,761,618 A | * | 6/1998 | Lynch et al. | 455/419 |
| 5,826,188 A | * | 10/1998 | Tayloe et al. | 455/428 |
| 5,862,480 A | * | 1/1999 | Wild et al. | 455/432.2 |
| 5,884,168 A | * | 3/1999 | Kolev et al. | 455/432.1 |
| 5,884,175 A | * | 3/1999 | Schiefer et al. | 455/436 |
| 5,903,832 A | | 5/1999 | Seppanen et al. | |
| 5,917,811 A | * | 6/1999 | Weaver, Jr. et al. | 370/332 |

(Continued)

FOREIGN PATENT DOCUMENTS

| | | | | |
|---|---|---|---|---|
| GB | 2 289 191 A | | 11/1995 | |
| GB | 2289191 A | * | 11/1995 | .............. H04Q 7/38 |
| WO | WO 99/45723 | | 9/1999 | |

OTHER PUBLICATIONS

U.S. Office Action dated Jul. 23, 2012 received in related case, namely U.S. Appl. No. 12/846,466.

(Continued)

*Primary Examiner* — Steve D Agosta
*Assistant Examiner* — Fred Casca
(74) *Attorney, Agent, or Firm* — Scully Scott Murphy & Presser PC

(57) ABSTRACT

The invention provides a method of handover from an active network to a selected one of a plurality of potential other networks. In addition to the overall solution, the solution proposed has several individual aspects. All subsidiary aspects are related to the common problem mentioned above and sharing the underlying common solution concept of implementing a system in which selective handover is possible and in which a list of available other networks provided by an active network can be handled and selection made by a terminal, so that neighbor cell information can be transmitted based on expressed terminal preferences.

15 Claims, 1 Drawing Sheet

(56) References Cited

U.S. PATENT DOCUMENTS

| | | | |
|---|---|---|---|
| 5,940,761 A * | 8/1999 | Tiedemann et al. | 455/437 |
| 5,999,811 A * | 12/1999 | Molne | 455/432.3 |
| 6,026,300 A * | 2/2000 | Hicks | 455/434 |
| 6,026,301 A | 2/2000 | Satarasinghe | |
| 6,044,265 A * | 3/2000 | Roach, Jr. | 455/419 |
| 6,064,887 A * | 5/2000 | Kallioniemi et al. | 455/445 |
| 6,075,981 A * | 6/2000 | Shah et al. | 455/403 |
| 6,088,335 A * | 7/2000 | I et al. | 370/252 |
| 6,122,503 A * | 9/2000 | Daly | 455/419 |
| 6,125,280 A * | 9/2000 | Grandhi et al. | 455/446 |
| 6,141,565 A * | 10/2000 | Feuerstein et al. | 455/560 |
| 6,148,197 A * | 11/2000 | Bridges et al. | 455/432.3 |
| 6,185,422 B1 * | 2/2001 | Mattila | 455/434 |
| 6,201,962 B1 * | 3/2001 | Sturniolo et al. | 455/432.2 |
| 6,201,969 B1 | 3/2001 | Meier | |
| 6,208,857 B1 * | 3/2001 | Agre et al. | 455/428 |
| 6,223,030 B1 * | 4/2001 | Van Den Heuvel et al. | 455/435.2 |
| 6,236,860 B1 * | 5/2001 | Hagting et al. | 455/436 |
| 6,246,875 B1 | 6/2001 | Seazholtz et al. | |
| 6,272,315 B1 * | 8/2001 | Chang et al. | 455/13.1 |
| 6,311,054 B1 * | 10/2001 | Korpela | 455/406 |
| 6,377,804 B1 * | 4/2002 | Lintulampi | 455/435.2 |
| 6,387,027 B1 * | 5/2002 | Bodin | 455/419 |
| 6,400,951 B1 * | 6/2002 | Vaara | 455/436 |
| 6,405,038 B1 * | 6/2002 | Barber et al. | 455/434 |
| 6,434,390 B2 * | 8/2002 | Rahman | 455/440 |
| 6,438,370 B1 * | 8/2002 | Einola et al. | 455/422.1 |
| 6,449,482 B1 * | 9/2002 | Johansson et al. | 455/443 |
| 6,493,539 B1 * | 12/2002 | Falco et al. | 455/67.11 |
| 6,510,146 B1 * | 1/2003 | Korpela et al. | 370/332 |
| 6,574,473 B2 * | 6/2003 | Rinne et al. | 455/436 |
| 6,584,116 B1 * | 6/2003 | Gourgue et al. | 370/442 |
| 6,600,925 B1 * | 7/2003 | Rams | 455/445 |
| 6,614,769 B1 * | 9/2003 | Erlick et al. | 370/331 |
| 6,728,540 B1 | 4/2004 | DeSantis et al. | |
| 6,792,283 B1 * | 9/2004 | Roberts et al. | 455/525 |
| 6,947,398 B1 | 9/2005 | Ahmed et al. | |
| 7,184,765 B1 | 2/2007 | Birnie et al. | |
| 7,778,641 B1 * | 8/2010 | Willars et al. | 455/436 |
| 2002/0045447 A1 * | 4/2002 | Rasanen | 455/436 |
| 2002/0052206 A1 | 5/2002 | Longoni | |
| 2002/0122396 A1 | 9/2002 | Terasawa | |
| 2007/0066320 A1 | 3/2007 | Padovani et al. | |

OTHER PUBLICATIONS

U.S. Office Action dated Nov. 9, 2011 received in related case, namely U.S. Appl. No. 12/846,466.

U.S. Office Action received in a related U.S. Patent Application, namely U.S. Appl. No. 12/846,466.

U.S. Office Action dated Jul. 19, 2011 received in related case, namely U.S. Appl. No. 12/846,466.

* cited by examiner

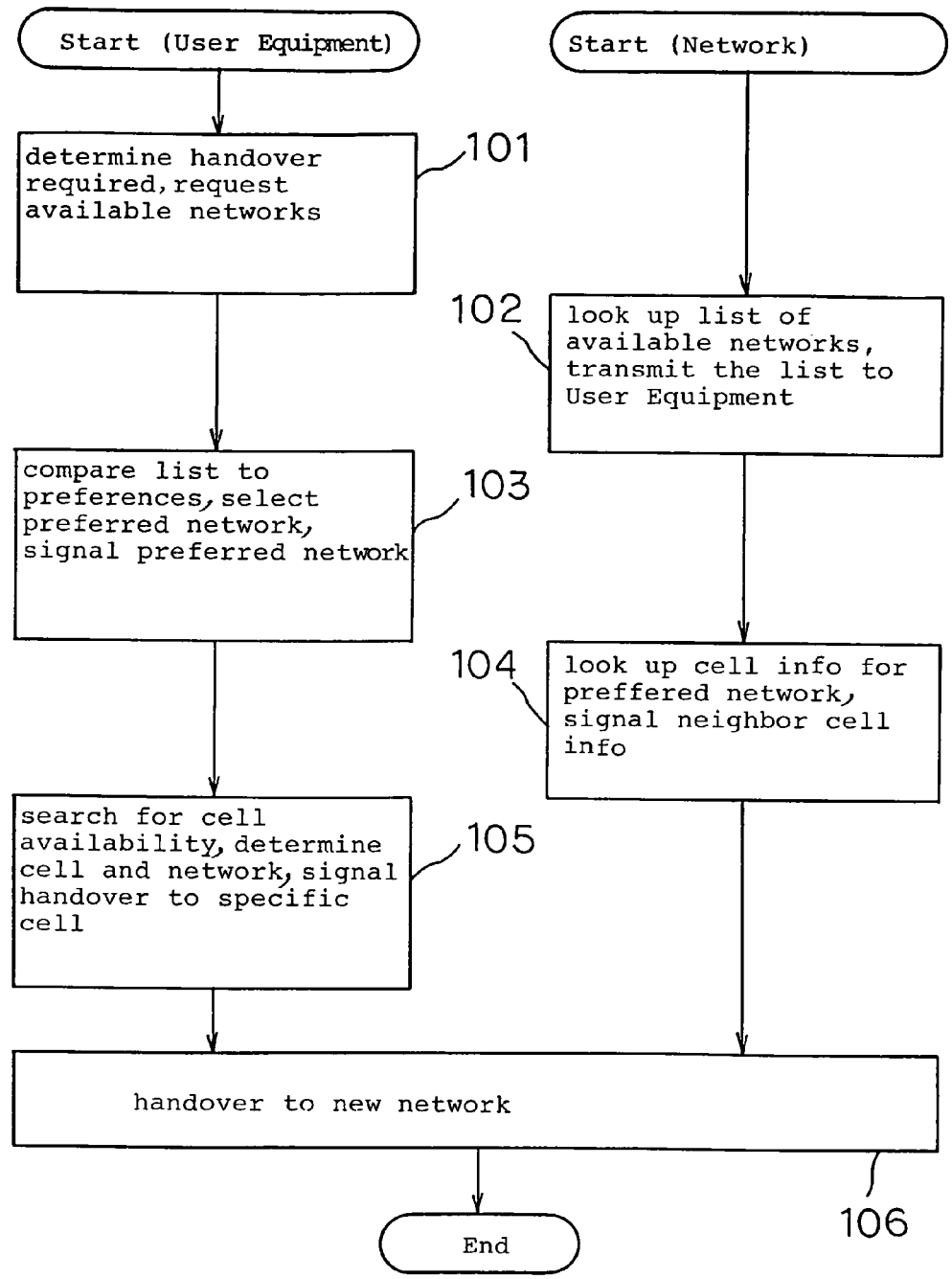

HANDOVER BETWEEN MOBILE COMMUNICATION NETWORKS

BACKGROUND OF THE INVENTION

1. Field of the Invention

The present invention is concerned with handover of a call between mobile communication networks. The present invention is particularly concerned with handover between UMTS networks and GSM networks but is also applicable to handover between different GSM networks and different cellular mobile communication networks generally.

2. Description of the Related Art

In current GSM systems, it is possible for a user to select manually among a plurality of available GSM networks when a mobile device (User Equipment) is off line. It is also possible for the User Equipment to select a network automatically from among the available networks based on preferences stored in the User Equipment, normally in the SIM card. However, when a call is in progress, this selection is not possible. In the present specification, the term User Equipment is intended to encompass any equipment capable of communicating with a network; this will typically be a mobile telephone, but may be, for example, a dedicated data, facsimile, E-mail or video communication device or combination device.

During call progress, the majority of the User Equipment's radio resource are involved in the active call and so it is not possible to scan broadly for available networks. To enable a mobile device to move between cells, while a call is in progress, the network supplies a limited list of adjacent cells, normally confined to cells provided by the same network provider and permits the mobile device to make limited investigation of signal strength from the neighboring cells. In the event that the mobile device finds a stronger signal from another cell, it can signal a change to the other cell.

According to above prior method, it is not impossible to hand over between mobile communication networks while call is in progress.

It has been appreciated that it would be desirable to enable User Equipment to select a preferred one of a plurality of available networks while a call is in progress. This would be particularly beneficial when handing over from a UMTS network to a selected GSM network', but would also be useful, particularly when traveling outside the User Equipment's home network territory, to enable handover between preferred "foreign" networks.

It has been appreciated that, although this is not normally done, it would be possible for an active network to supply a list of cells not only belonging to the active network, but also including cells of other network providers. This potentially offers a solution to the problem mentioned above, and may be provided independently in an aspect of the invention.

However, to implement the system, the network provider would have to supply a significant amount of information concerning other network providers' cells. Therefore, the above mentioned potential solution has the attendant problem that the list of available cells may become too large in practical terms for the User Equipment to investigate during an active call, and this may degrade performance of the network. This solution may therefore be undesirable for many network providers.

SUMMARY OF THE INVENTION

It is an object of the present invention is to provide a method capable of handing over between mobile communication networks while call is in progress.

Pursuant to the invention, an improved solution has been proposed. According to the first main aspect of the invention, the invention provides a method of facilitating handover from an active network with which User Equipment is in communication to another network. According to the present invention, the active network provides a list of available other networks to the User Equipment. User Equipment selects among the available networks based on preference information and signals to the active network at least one preferred other network. The active network provides neighbor cell information for the at least one preferred other network to the User Equipment.

In this way, the User Equipment may signal a preferred network to the active network and then the active network may transmit cell information for only the preferred networks) to that User Equipment.

The preference information may be stored in the User Equipment, preferably in the SIM card. The preference information may include a list of networks which are "black listed" with which the User Equipment is not able to connect. The preference information may also include a list of networks which are "white listed" with which communication is preferred. The white list may include partner networks of the home network provider. The preference information may include an explicit "gray list" of networks which are to be tried in the absence of a "white listed" network; alternatively, networks which are not explicitly in the white list or black list may be deemed to be in the gray list. Multiple levels of preference may be stored. Preferably, the method includes storing in the User Equipment a list of available networks based on information supplied by the active network. This feature, using information supplied by a network rather than that obtained by a (relatively lengthy) search performed by the User Equipment, offers advantages.

The method may include incrementally adding to or deleting from the list of available networks stored in the User Equipment. This feature avoids the need to re-transmit a complete list, thereby allowing shorter messages to be used.

Using the method of claim 1, it becomes possible for a network to send different neighbor cell information to different terminals (User Equipment), based on preferences expressed by the terminals and not solely dependent on the area in which the terminals are located.

The signalling of available networks by an active network, the first step in the method of claim 1, is of itself a useful step as it provides a terminal with information concerning available networks without the terminal having to search.

The signalling by a terminal to an active network with which the terminal is in communication of a preferred (other) network (effectively the second step in the method of claim 1) in itself provides useful information to the active network.

The invention extends to methods of operating terminals and to methods of operating networks, terminals and network for implementing any the above aspects.

In a first preferred implementation, the active network is a UMTS network and the list of available networks comprises a list of available GSM networks. This implementation facilitates handover from UMTS to a selected GSM network.

In a second implementation, the active network is a GSM network (or a UMTS network) provided by an active network provider and the list of available networks comprises a list of other GSM networks (or UMTS networks) provided by other network providers. This facilitates handover within a communication system between network providers.

The above and other objects, features and advantages of the present invention will become apparent from the following description with reference to the accompanying drawings which illustrate examples of the present invention.

BRIEF DESCRIPTION OF THE DRAWINGS

FIG. 1 is a flowchart showing a processing of the first embodiment according to the present invention.

DETAILED DESCRIPTION OF THE PREFERRED EMBODIMENTS

An embodiment of the invention will now be described, by way of example.

By way of explanation, we will describe in general terms, the elements of a practical implementation of a handover system embodying several of the above aspects and advantageous features. The following applies to both handover between networks of a similar type (e.g. GSM) belonging to different network providers, or between networks—of differing types (e.g. UMTS to GSM), unless otherwise stated. Indeed, in certain applications it may be possible to select between multiple networks of multiple types, for example GSM 900, GSM 1900, UMTS and local coverage networks.

Features of User Equipment

In addition to "standard" user equipment features, for communicating with the networks between which handover is to be performed (for a UMTS to GSM handover, this requires a dual mode terminal), the user equipment should ideally have the following components:—

A store for a list of network preferences.

This may be based on an existing store, preferably in the SIM card (which term as used in this specification is intended to encompass any removable device which is used to configure a standard handset), and will normally be at least partially pre-programmed by the home network provider. The equipment may be configured to allow the user to edit at least part of this list, for example by adding networks or modifying preference levels.

In particular, where a network provider has two or more partner networks in a given (foreign) country and the charges vary (either permanently or from time to time) between networks, the user (or the network provider) may update the preference list so that the cheaper network is always preferred. The preference list may simply be binary, 0 for never use ("blacklisted"), 1 for use if possible ("white listed"), unlisted networks being used if a network annotated 1 is not found.

Alternatively, multiple levels may be stored; this facilitates differentiation on the basis of pricing. If multiple levels are used, the home network may be given a unique, highest, preference. If only two or a few levels are provided, the home network may nonetheless be specifically marked, if desired. Although it is greatly preferred to store the preferences, the user may be prompted to select all alternative network on demand; this will normally be inconvenient during a voice call, but may be more acceptable in a data communication application. The order in which the networks are listed may or may not be significant; if it is, even in a binary system, the order of networks within the stored list may be used to designate preference and all white listed networks may be ranked in order. Thus, in the selecting step, the User Equipment may be arranged to find the first white listed available network.

—Means for Receiving and Interpreting a Message Specifying Available Networks.

The User Equipment must be able to interpret a special message sent during an active call from the active network listing possible handover networks. This may be based on existing facilities for interpreting messages during a call, the special message being identified by a special prefix or identifier agreed with the network. It is to be noted that it may only be possible to perform preferential handover from certain networks but not others, particularly where certain networks are not configured to provide special messages identifying neighboring networks. For example, in the case of UMTS to GSM handover, the UMTS network may be arranged to provide a list of candidate GSM networks, but, when attempting to hand back to UMTS from a GSM network, or when attempting to hand over between at least certain GSM networks, this may not be possible as the GSM network(s) may not be adapted to provide lists of candidate networks.

—Means for Maintaining List of Available Networks.

Preferably, the User Equipment is able, in addition to (or instead of) receiving a complete list of available networks, to receive and interpret messages specifying incremental addition or deletion of networks from the current list of available networks. In this way, a complete list of available networks may be built up in the User Equipment by a series of "ADD" messages, rather than by transmitting a complete list. This feature is particularly desirable in regions where there are a number of networks from which to choose and the availability of each network changes from place to place frequently, as it avoids the need to re-transmit a long list each time one network becomes or ceases to be available.

—Means for Requesting a List of Available Networks.

The network may be arranged to transmit available network information regularly or when the network determines that handover is desirable (for example when the received signal becomes weak). However, preferably, the User Equipment is able specifically to request this information; this may be achieved in a similar manner to the conventional manner for User Equipment to send a handover, but using a message identifier agreed with the network as signifying a request for available networks.

—Means for Comparing the List of Available Networks to the List of Preferences and Selecting a Network.

This may be achieved simply by searching for each available network in the list of preferences and returning the one (or top several) with the highest preference. Where more than one available network has an equal top preference, the User Equipment may select several in turn and then, following receipt of radio cell information, select the network with the strongest signal. Alternatively, other criteria may be provided.

—Means for Signalling the Preferred Network.

This may be achieved simply by sending a message with an identifier agreed with the network to signify a network selection.

Thereafter, the network would supply neighbor cell information for the selected network(s) in a similar manner to that presently used to enable cell-to-cell handover and the User Equipment would treat this cell information (radio frequencies, time slots codes, etc.) in the same way to find the most suitable handover candidate.

Features of Network

In addition to "standard" network parameters, a network should implement the following features:—

—Store of List of Available Other Networks.

This list varies from point to point, so it is conveniently stored at each base station or radio access point. This may be based on stored information, obtained either based on knowledge of other networks in the area and predicted coverage, or based on empirical data, for example obtained by scanning for radio coverage throughout he region covered by a cell, or by fixed receivers located at the access point and surrounding access points. Normally the network will not know the position of the User Equipment to much better than 1 cell accuracy (although, by triangulation from other cells in the network, accurate positioning is possible; alternatively, a rough idea of direction within the cell may be obtained), so the list of potentially available networks may include all networks receivable at any point within the cell. If the list omits certain networks which are in fact available, then handover to those networks will not be possible, so it is desirable to include more rather than fewer in the list. However, where too many networks are included, efficiency will be degraded, as the User Equipment may be instructed to search for an "available" network which is in fact not available. It may be possible to update the list dynamically, based on information returned from User Equipment concerning availability of networks.

For each available network, corresponding neighbor cell information (frequencies, time slots etc.) should be stored.

The network is configured to send and respond to messages described above in relation to the User Equipment. Thus, in a practical example, processing steps and exchange of messages are shown in FIG. 1.

At step 101, User Equipment determines handover required and request available networks. At step 102, the active network looks up list of available networks and transmits the list to the User Equipment. At step 103, User Equipment compares the list to preferences, selects preferred network and signals the preferred network to the active network. At step 104, the active network looks up cell information for preferred network and signals neighbor cell information to the User Equipment. At step 105, the User Equipment searches for cell availability, determines cell and network and signals handover to specific cell. Finally, at step 106, handover to new network is implemented.

2nd Embodiment

The first embodiment above deals with transmission of a complete list of available networks in response to a specific request. The following second embodiment deals in particular with incremental updating of the list of available networks, and these details may be used in other contexts (not only in the UMTS to GSM handover case in which it is explained), for example in GSM to GSM handover.

Application to UMTS to GSM Handover

Three novel signaling procedures are proposed as below. All these procedures rely on local interaction between the dual mode terminal and the UTRAN, with no involvement of the VLR or core network.

We will assume that while a dual mode terminal has a call in progress, it maintains a list of potential GSM handover candidates {G1, G2, G3, . . . } (which may contain no entries if no potential GSM handover candidate is available). At any time it also has a preferred candidate Gpref which is a member of {G1, G2, G3, . . . }. This proposal describes signalling means whereby this list is maintained.

Signalling the Availability of Candidate GSM Networks

At any time during a call the serving UMTS network U can signal to the dual mode terminal the identity of one or more GSM network that are available, {Gi.} for potential handover. This signal contains the unique network identifier of each potential GSM network. This message would typically be used when the terminal first enters the coverage area of a potential candidate GSM network while a call is active, or sets up a call while within its coverage area, The terminal records the identity of the GSM networks, and compare it with internally stored information (for example a network preference list stored on the SIM and the identity of other available GSM networks previously signalled to it) and signals its preference Gpref back to the serving network, if it can identify a suitable network.

After this the serving network provides neighbor cell information relating to network Gpref until such time as the call ends, the terminal leaves the network or the terminal indicates a new value of Gpref.

Signalling the Non-Availability of an Existing Candidate GSM Network

When the terminal leaves the coverage area of a potential candidate GSM network during a call, the serving radio network U can signal to the terminal at any time the identity of GSM networks, {Gi.} that are now unavailable. This signal contains the unique network identifier of the GSM network which is no longer available.

The terminal can note that this GSM network is no longer available, and using internally, stored information (for example a network preference list stored on the SIM and the identity of remaining available GSM networks) signals its preference Gpref back to the serving network, if a suitable network is identified.

After this the serving network provides neighbor cell information relating to network Gpref until such time as the call ends, the terminal leaves the network or the terminal indicates a new value of Gpref.

Terminal Network Preference

At any time the terminal can signal a new preference Gpref back to the serving network, which would be chosen from the list of available networks. After this the serving network provides neighbor cell information relating to network Gpref until such time as the call ends, the terminal leaves the network or the terminal indicates a new value of Gpref.

Typically this signal would be sent if the list of available GSM network changed in such a way that the preferred network needed to be re-evaluated.

In the above described second embodiment, the mobile device always has a preferred other network stored and is therefore regularly updated with neighbor cell information for that preferred network. This is particularly useful in the case of a dual mode terminal (the case of UMTS, to GSM handover being one example, GSM 900 to GSM 1900 being another example) where the "unused" mode components can be kept up dated and ready to change as soon as required.

To summarize, the above embodiment's provide the following novel features, each of which may be independently provided:—

The signalling of available GSM candidate network information.

The maintenance in the terminal of a list of available networks.

The possibility of incremental addition and deletion of elements of that list.

The ability of the terminal to indicate the preferred network.

The ability to send selective neighbor cell information to different dual mode terminals, so that different terminals within the same area may receive different neighbor cell information.

While preferred embodiments of the present invention have been described using specific terms, such description is for illustrative purposes only, and it is to be understood that changes and variations may be made without departing from the spirit or scope of the following claims.

What is claimed is:

1. A method for user equipment for a mobile communication system comprising:

receiving a message on said user equipment including a first list including a plurality of network identifiers corresponding to a plurality of available networks for a potential handover, the plurality of available networks are determined by the current active communication network by scanning an area for all available networks within the area, said receiving from a current active communication network while a call subject to a potential handover is in progress, the message includes a special identifier indicating that said message contains a list of available networks for handover;

storing the first list;

selecting at least one network of the plurality of available networks as a candidate for handover based upon a comparing of said first list with a second list stored in the user equipment;

transmitting from the user equipment to the current active communication network an indication of at least one preferred other network based on the selecting;

receiving, by the user equipment, neighboring cell information for each of the at least one preferred other network based on the indication, the neighboring cell information including at least a network frequency and time slot, and receiving, by the user equipment, a second message including at least one network identifier corresponding to a network that is to be deleted from the first list, wherein said current active communication network signals one or more of the plurality of network identifiers corresponding to the plurality of available networks for the potential handover, and said receiving of said message occurs without said user equipment searching any communication network.

2. The method for user equipment for a mobile communication system according to claim 1, wherein said message is a dedicated message for signaling available networks for handover.

3. The method for user equipment for a mobile communication system according to claim 1, wherein said message is periodically transmitted by said current active network without a specific request.

4. The method for user equipment for a mobile communication system according to claim 1, further comprising:

comparing the received first list with a second list stored in the user equipment, said second list including at least one network identifier being an identifier of a network that is never to be used.

5. The method for user equipment for a mobile communication system according to claim 1, further comprising:

transmitting a request, from the user equipment to the current active communication network for the first list, wherein said current active communication network scans an area for all available networks within the area in response to the request.

6. User equipment for a mobile communication network comprising:

means for receiving a message that includes a first list including a plurality of network identifiers corresponding to a plurality of available networks for a potential handover, from a current active communication network while a call subject to a potential handover is in progress, the plurality of available networks are determined by the current active communication network by scanning an area for all available networks within the area, the message includes a special identifier indicating that said message contains a list of available networks for handover;

means for storing the first list;

means for selecting at least one network of the plurality of available networks as a candidate for handover based on a comparing of said first list with a second list stored in the user equipment;

means for transmitting to the current active communication network an indication of at least one preferred other network based on the selecting;

means for receiving neighboring cell information for each of the at least one preferred other network based on the indication, the neighboring cell information including at least a network frequency and time slot, and means for receiving a second message including at least one network identifier corresponding to a network that is to be deleted from the first list, wherein said current active communication network signals one or more of the plurality of network identifiers corresponding to the plurality of available networks for the potential handover, and said receiving of said message occurs without said user equipment searching any communication network.

7. A mobile communications network comprising:

means for transmitting a message that includes a first list including a plurality of network identifiers corresponding to a plurality of available networks for a potential handover, the plurality of available networks are determined by a serving communication network by scanning an area for all available networks within the area, the message being transmitted from the serving communication network while a call subject to a potential handover is in progress, the message includes a special identifier indicating that said message contains a list of available networks for handover;

means for receiving from user equipment communicating with the serving communication network an indication of at least one preferred other network;

means for supplying neighboring cell information to the user equipment for each of the at least one preferred other network based on the indication, the neighboring cell information includes at least a network frequency and time slot, and means for transmitting a second message including at least one network identifier corresponding to a network that is to be deleted from the first list, wherein said serving communication network signals one or more of the plurality of network identifiers corresponding to the plurality of available networks for the potential handover, and said transmitting of said message occurs without said user equipment searching any communication network.

8. The mobile communications network of claim 7, further comprising:

means for scanning an area for all available networks within the area; and means for storing a list of available networks based upon the scanning and corresponding cell information.

9. The mobile communications network of claim 8, further comprising:

means for receiving a request, from the user equipment for the first list, wherein the means for transmitting is activated by the request.

10. The mobile communications network of claim 8, wherein the means for scanning is in a base station.

11. The mobile communications network of claim 7, wherein the serving communication network is a UMTS network and at least one of the plurality of available networks is a GSM network.

12. The mobile communications network of claim 7, wherein the serving communication network is a GSM network and at least one of the plurality of available networks is a UMTS network.

13. The mobile communications network of claim 7, wherein the serving communication network is provided by a first network provider and at least one of the plurality of available networks is provided by a different network provider.

14. User equipment for a mobile communication network comprising:
- a receiver for receiving a message that includes a first list of a plurality of network identifiers corresponding to a plurality of available networks for a potential handover, from a current active communication network while a call subject to a potential handover is in progress the plurality of available networks are determined by the current active communication network by scanning an area for all available networks within the area, the message includes a special identifier indicating that said message contains a list of available networks for handover and for receiving a second message including at least one network identifier corresponding to a network that is to be deleted from the first list;
- a storage device storing the first list;
- a selector for selecting at least one network of the plurality of available networks as a candidate for handover based on a comparing of said first list with a second list stored in the user equipment; and
- a transmitter for transmitting to the current active communication network an indication of at least one preferred other network based on the selecting,
- wherein the receiver further receives neighboring cell information for each of the at least one preferred other network, the neighboring cell information including at least a network frequency and time slot,
- wherein said current active communication network signals one or more of the plurality of network identifiers corresponding to the plurality of available networks for the potential handover, and said receiver receives said message without said user equipment searching any communication network.

15. A method for user equipment for a mobile communication system comprising:
- receiving a message on said user equipment including a first list including a plurality of network identifiers corresponding to a plurality of available networks for a potential handover, the plurality of available networks are determined by the current active communication network by based upon a location of said user equipment, said receiving from a current active communication network while a call subject to a potential handover is in progress, the message includes a special identifier indicating that said message contains a list of available networks for handover and a second message including at least one network identifier corresponding to a network that is to be deleted from the first list;
- storing the first list;
- selecting at least one network of the plurality of available networks as a candidate for handover based upon a comparing of said first list with a second list stored in the user equipment,
- transmitting from the user equipment to the current active communication network an indication of at least one preferred other network based on the selecting;
- receiving, by the user equipment, neighboring cell information for each of the at least one preferred other network based on the indication, the neighboring cell information including at least a network frequency and time slot, and
- receiving, by the user equipment, a second message including at least one network identifier corresponding to a network that is to be deleted from the first list,
- wherein said current active communication network signals one or more of the plurality of network identifiers corresponding to the plurality of available networks for the potential handover, and said receiving of said message occurs without said user equipment searching any communication network.

* * * * *